(12) United States Patent
Kise

(10) Patent No.: US 8,699,069 B2
(45) Date of Patent: Apr. 15, 2014

(54) INFORMATION PROCESSING APPARATUS, INFORMATION PROCESSING METHOD, AND STORAGE MEDIUM FOR PROCESSING JOB DATA STORED IN A FOLDER

(75) Inventor: Takashi Kise, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 191 days.

(21) Appl. No.: 13/303,229

(22) Filed: Nov. 23, 2011

(65) Prior Publication Data

US 2012/0133981 A1 May 31, 2012

(30) Foreign Application Priority Data

Nov. 30, 2010 (JP) .................................. 2010-267503

(51) Int. Cl.
*G06K 15/02* (2006.01)
(52) U.S. Cl.
USPC ......................................................... 358/1.15
(58) Field of Classification Search
USPC .......................................................... 358/1.15
See application file for complete search history.

(56) References Cited

U.S. PATENT DOCUMENTS

| 2006/0290975 A1* | 12/2006 | Murakami et al. ............ 358/1.15 |
| 2007/0143354 A1* | 6/2007 | Morooka ....................... 707/200 |
| 2011/0164277 A1* | 7/2011 | Wada et al. ................... 358/1.15 |

FOREIGN PATENT DOCUMENTS

| JP | 2006-040060 A | 2/2006 |
| JP | 2006-222661 A | 8/2006 |

OTHER PUBLICATIONS

Image of web page entitled "SilverFast Hot-Folder" and dated Dec. 20, 2009, at http://web.archive.org/web/20091220081819/http://www.silverfast.com/highlights/hotfolder/en.html.

* cited by examiner

*Primary Examiner* — Qian Yang
(74) *Attorney, Agent, or Firm* — Carter, DeLuca, Farrell & Schmidt LLP

(57) ABSTRACT

When an execution instruction file including a description of an instruction to execute processing is input into a first folder, job data to be subjected to processing that is stored in the first folder is moved to a second folder different from the first folder. After the movement, a file including a description indicating that execution of the processing is underway is stored in the first folder. The processing is executed with respect to the job data to be subjected to the processing that was moved to the second folder, and when the processing ends, a file including a description of an end of the processing is stored in the first folder in place of the file including a description indicating that execution of the processing is underway.

6 Claims, 11 Drawing Sheets

| DATA ACCESS | OPERATOR | USER A | USER B |
|---|---|---|---|
| SYSTEM DATA | ○ ACCESSIBLE | △ PARTIALLY ACCESSIBLE | △ PARTIALLY ACCESSIBLE |
| USER A DATA | × INACCESSIBLE | ○ ACCESSIBLE | × INACCESSIBLE |
| USER B DATA | × INACCESSIBLE | × INACCESSIBLE | ○ ACCESSIBLE |

INFORMATION PROCESSING APPARATUS, INFORMATION PROCESSING METHOD, AND STORAGE MEDIUM FOR PROCESSING JOB DATA STORED IN A FOLDER

BACKGROUND OF THE INVENTION

1. Field of the Invention

The present invention relates to an information processing apparatus for processing job data stored in a folder, an information processing method thereof, and a storage medium for storing a program thereof.

2. Description of the Related Art

There is known to be a job management controller having a function of unifying various data files such as computer compatible documents and images, and control files such as a print setting, into a single job, converting the job, of which execution is instructed, into a format printable with a printer, and transmitting it to the printer. The use of a hot folder is also known as a method for registering the above described job. The hot folder capable of having various settings set in advance with respect to jobs has a function of automatically executing a job that was input into the hot folder.

Japanese Patent Laid-Open No. 2006-222661 discloses a technique in which jobs are stored in units of sub-folders under a hot folder, thereby enabling a job state to be confirmed from the folder name thereof. With SilverFast Hot-Folder from LaserSoft Imaging Co., Ltd. (http://www.silverfast.com/highlights/hotfolder/jp.html), original data is stored in a folder specified as an archive directory in a case where a job is normally executed, whereas an error file is stored in a folder specified as an error directory in a case where an error occurs. Also, Japanese Patent Laid-Open No. 2006-040060 discloses the setting of a user access control for each hot folder.

According to the Japanese Patent Laid-Open No. 2006-222661, during execution of a job, the user can access data within a job folder in execution and can change contents of the data or can delete the data, which may invite an occurrence of an obstacle. With SilverFast Hot-Folder from LaserSoft Imaging Co., Ltd. (http://www.silverfast.com/highlights/hot-folder/jp.html), a specific folder is designated for each hot folder as a storage place for storing job data upon a normal execution of the job or the occurrence of an error. In this case, however, the user needs to refer to a setting of the hot folder in order to obtain an output destination and confirm a processing state.

According to Japanese Patent Laid-Open No. 2006-040060, the user access control can be set for every hot folder; however, the user having an accessing authority to a certain hot folder can access jobs of the other users within the same folder. In order to eliminate the above mentioned problems, the hot folder may be prepared for each user. However, such a configuration makes it impossible to change a hot folder setting shared in the entire system.

SUMMARY OF THE INVENTION

An aspect of the present invention is to eliminate the above-mentioned problems with the conventional technology. The present invention provides an information processing apparatus capable of securely processing job data stored in a folder and providing simple indication of the processing state of the job data, an information processing method thereof, and a storage medium for storing a program thereof.

The present invention in its first aspect provides an information processing apparatus for processing job data stored in a folder, comprising: an input unit configured to input an execution instruction file including a description of an instruction to execute a processing into a first folder; a movement unit configured to move job data to be subjected to the processing that is stored in the first folder to a second folder different from the first folder when the execution instruction file is input by the input unit; a first storage unit configured to store a file including a description indicating that execution of the processing is underway in the first folder after the movement by the movement unit; an execution unit configured to execute the processing with respect to the job data to be subjected to the processing that was moved to the second folder by the movement unit; and a second storage unit configured to store a file including a description of an end of the processing in the first folder in place of the file including a description indicating that execution of the processing is underway when the processing by the execution unit ends.

The present invention in its second aspect provides an information processing method to be executed in an information processing apparatus for processing job data stored in a folder, the method comprising: an input step of inputting an execution instruction file including a description of an instruction to execute a processing into a first folder; a moving step of moving job data to be subjected to the processing that is stored in the first folder to a second folder different from the first folder when the execution instruction file is input in the input step; a first storing step of storing a file including a description indicating that execution of the processing is underway in the first folder after the movement in the moving step; an execution step of executing the processing with respect to the job data to be subjected to the processing that was moved to the second folder in the moving step; and a second storing step of storing a file including a description of an end of the processing in the first folder in place of the file including a description indicating that execution of the processing is underway when the processing in the execution step ends.

The present invention in its third aspect provides a computer readable storage medium for storing a program that causes a computer to function so as to: input an execution instruction file including a description of an instruction to execute a processing on job data into a first folder; move job data to be subjected to the processing that is stored in the first folder to a second folder different from the first folder when the execution instruction file is input; store a file including a description indicating that execution of the processing is underway in the first folder after the movement; execute the processing with respect to the job data to be subjected to the processing that was moved to the second folder; and store a file including a description of an end of the processing in the first folder in place of the file including a description indicating that execution of the processing is underway when the execution of the processing ends.

According to the present invention, secure processing can be executed with respect to the job data stored in the folder and the processing state of the job data can be simply indicated.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference signs have been given to constituent elements that are the same, and redundant descriptions thereof will not be given.

First Embodiment

Figure 14:
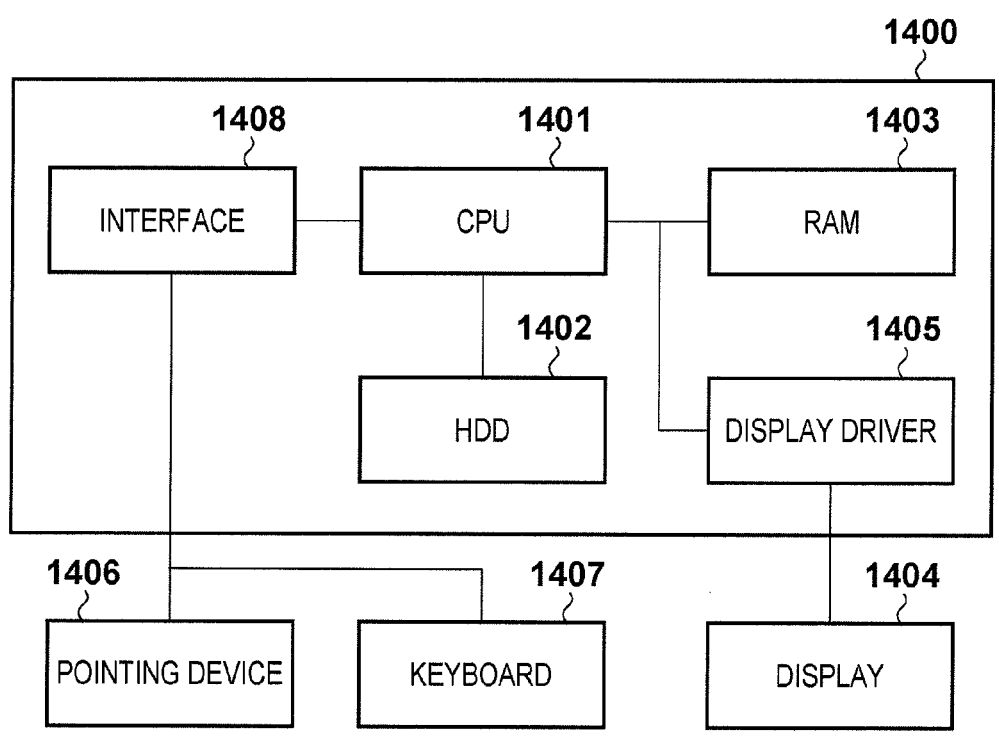
FIG. 14 illustrates a configuration of an information processing apparatus.

FIG. 14 illustrates a configuration of an information processing apparatus 1400 used in an embodiment according to the present invention. For example, a PC is used as the information processing apparatus 1400. A CPU 1401 controls each of the below-described blocks and, for example, a program read out from a hard disk 1402, a ROM (not illustrated), or the like is developed in a RAM 1403 to execute the program thereon. The HDD 1402 stores image data and programs for executing processing illustrated in the below-described flow chart. A display 1404 displays a user interface in the present embodiment, and a display driver 1405 controls the display 1404. The user can perform operations on a user interface by using a pointing device 1406 and a keyboard 1407 which are connected to the user interface via an interface 1408.

Figure 1:
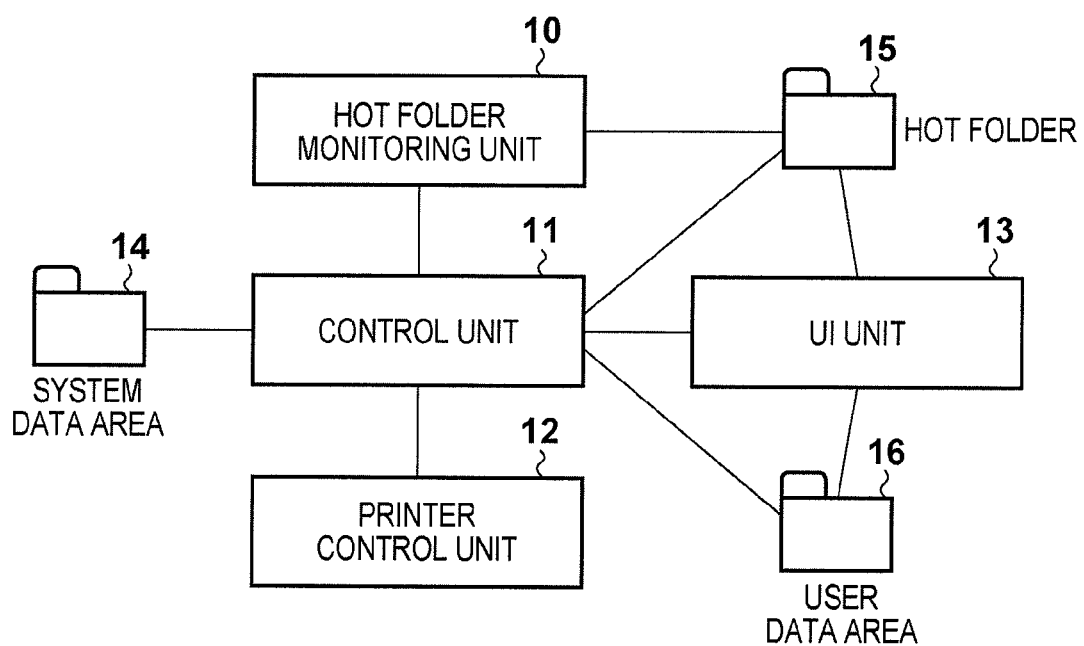
FIG. 1 is a block diagram illustrating a configuration of a job management system.

FIG. 1 is a block diagram illustrating a configuration of a job management system. A hot folder monitoring unit 10 monitors an input of a job into a hot folder 15 and transfers the processing to a control unit 11 when the job is input into the hot folder 15. When the control unit 11 receives the job from the hot folder monitoring unit 10, the control unit 11 moves or copies the job data (that is, job folder including a single job file or a plurality of job files) from the hot folder 15 or a user data area 16 linked from the hot folder 15 to a system data area 14. The control unit 11 performs job execution processing according to the job placed in the system data area 14 and instructs a printer control unit 12 to output the job to a printer. When the control unit 11 receives a notification indicative of an end of the job from the printer control unit 12, the control unit 11 causes the hot folder 15 or the user data area 16 to store information of the job execution result depending on the setting of the hot folder 15, according to whether the processing ends normally or abnormally.

Figure 2:
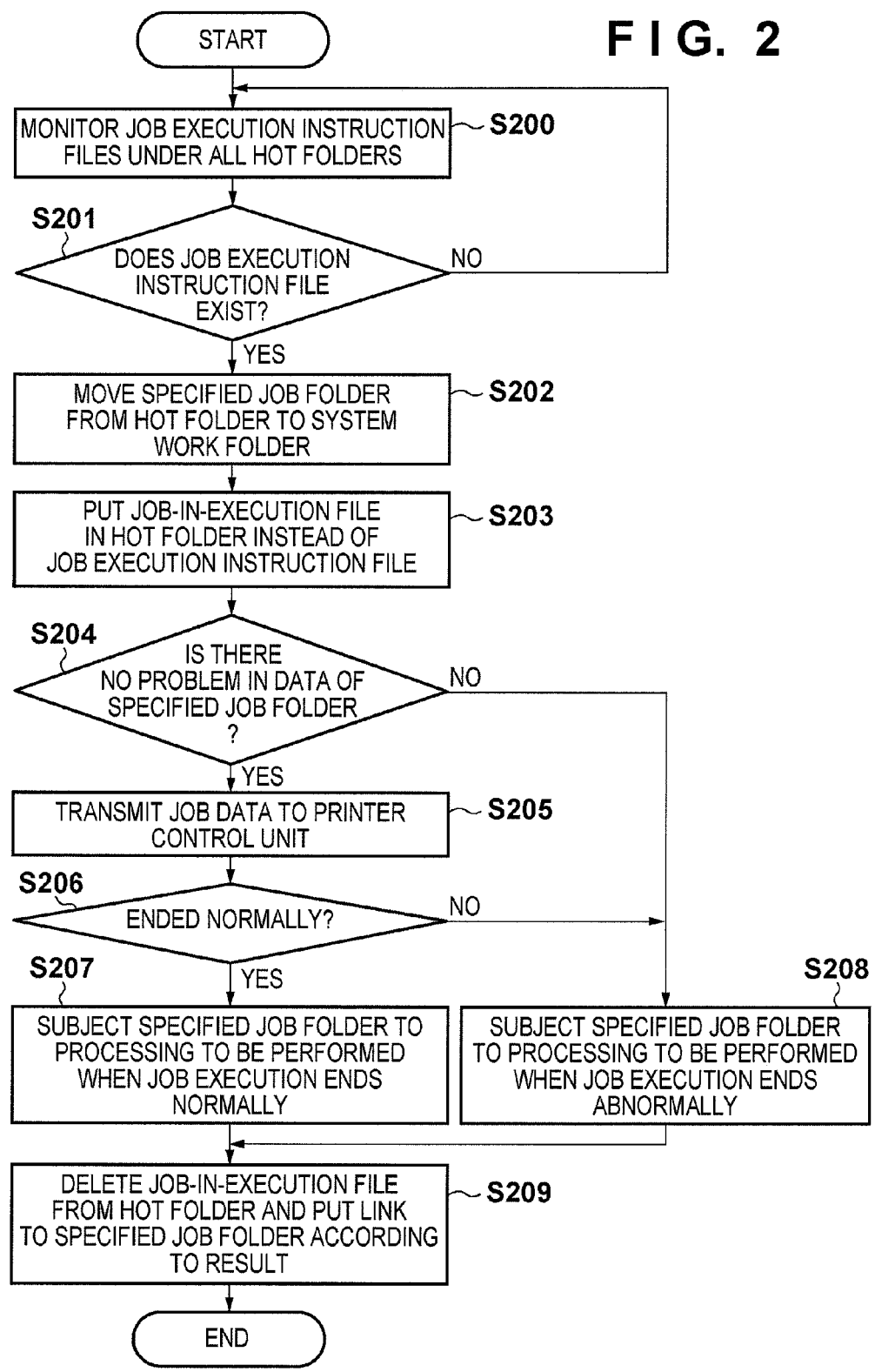
FIG. 2 is a flow chart illustrating a processing procedure of the job management system.

FIG. 2 is a flow chart illustrating a processing procedure of the job management system. The following describes processing according to the procedure illustrated in FIG. 2 with reference to FIGS. 3 to 7. The processing illustrated in FIG. 2 is executed by, for example, the CPU 1401 of the information processing apparatus 1400.

In steps S200 and S201, the hot folder monitoring unit 10 monitors whether or not the job execution instruction file has been input into the hot folder 15 (that is, execution has been instructed) to make a determination thereof. In a case where the hot folder monitoring unit 10 determines that the job execution instruction file has been input into the hot folder 15, the hot folder monitoring unit 10 notifies the input of the job to the control unit 11, and the control unit 11 executes the processing in and after step S202. On the other hand, in a case where the hot folder monitoring unit 10 determines that the job execution instruction file has not been input into the hot folder 15, the processing returns to step S200.

Figure 3:
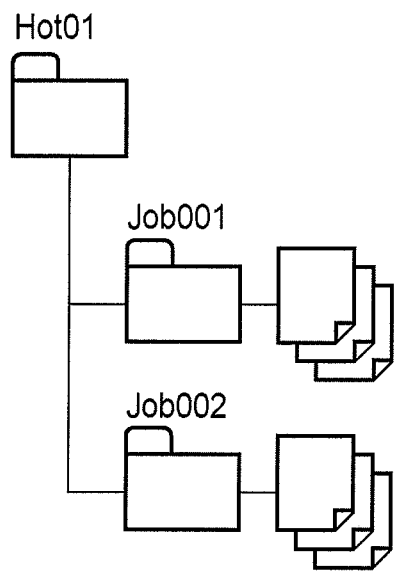
FIG. 3 illustrates a state in which a job execution instruction file has not been input in a first embodiment.
Figure 4:
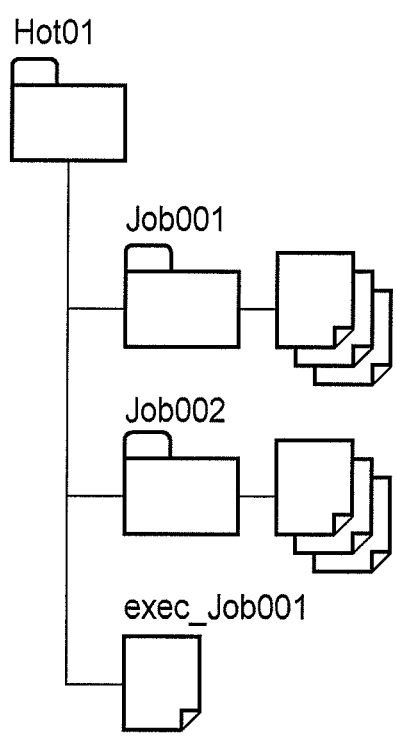
FIG. 4 illustrates a state in which the job execution instruction file has been input.

Here, the processing is described with reference to FIGS. 3 and 4. As illustrated in FIG. 3, the hot folder Hot01 (an example of a first folder) includes 2 folders Job001 and Job002 as job folders. While the job execution instruction file has not been input, the job is not executed. FIG. 4 illustrates a state immediately before the job is executed, at which a job execution instruction file exec_Job001 for the job Job001 has been input into the hot folder Hot01. The hot folder monitoring unit 10 detects that the job execution instruction file has been input into the hot folder Hot01 and notifies the input of the job to the control unit 11.

Figure 5:
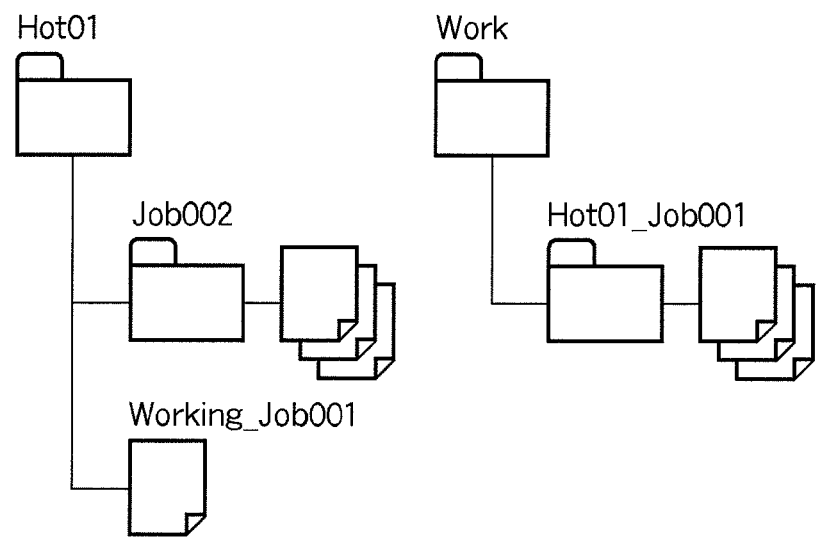
FIG. 5 illustrates a state of a folder while executing a job.

In step S202, when the control unit 11 receives a notification of the input of the job from the hot folder monitoring unit 10, the control unit 11 moves the job folder Job001 from the hot folder Hot01 to a system work folder Work (an example of a second folder) within the system data area 14. FIG. 5 illustrates a state thereof. At this time, the folder name is changed to Hot01_Job001 because information of the names of the hot folder and the job folder are inherited. Although the system work folder Work is created in advance in the present embodiment, the system work folder Work may be created when the hot folder monitoring unit 10 detects the input of the job.

In step S203, the job execution instruction file exec_Job001 is deleted and, instead thereof, a file Working_Job001 indicating that job execution is underway is placed under the hot folder Hot01 as illustrated in FIG. 5 (an example of a first storage). The file indicating that job execution is underway can be only referenced by the user. The job execution instruction file exec_Job001 thus deleted may be placed under the job folder Hot01_Job001, as required.

In step S204, when the job folder Hot01_Job001 is placed under the system work folder Work, the control unit 11 checks contents of the data within the job folder and determines whether there is no problem in transmitting the job data to a printer control unit. In a case where the control unit 11 determines that there is no problem in the job data, the processing proceeds to step S205, in which the control unit 11 transmits the job data to the printer control unit 12 after converting it as required. On the other hand, in a case where the control unit 11 determines that there is a problem (that is, error), the processing proceeds to step S208.

In step S206, the printer control unit 12 prints the job data via a printer and returns a result thereof to the control unit 11. The control unit 11 determines whether the execution ended normally or abnormally. In a case where the control unit 11 determines that the execution ended normally, the processing proceeds to step S207, and in a case where the control unit 11 determines that the execution ended abnormally, the processing proceeds to step S208.

Figure 6:
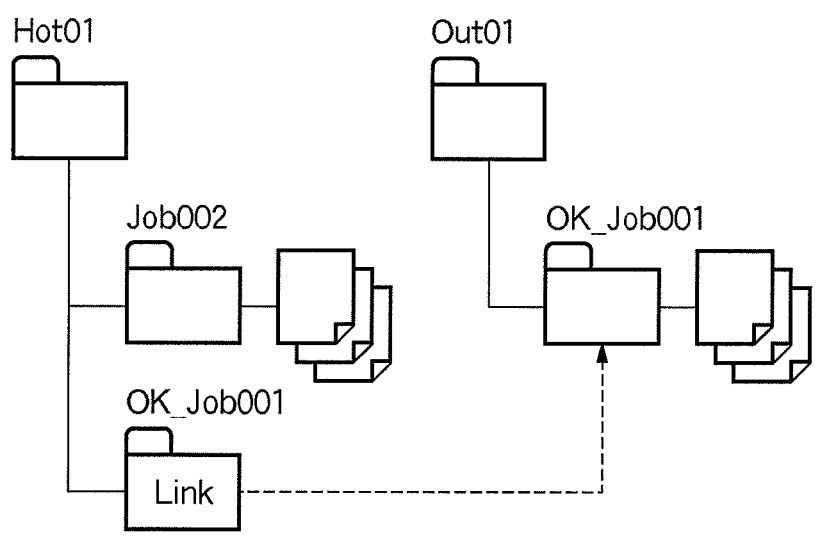
FIG. 6 illustrates a state of a folder when a job ends normally.

In step S207, processing to be performed when the job execution ends normally is performed with respect to a specified job folder. As illustrated in FIG. 6, the job folder Hot01_Job001 is moved from the system work folder Work to a folder Out01 (an example of a third folder) specified as an output destination of the hot folder Hot01, and the folder name is changed to OK_Job001.

Figures 7, 8:
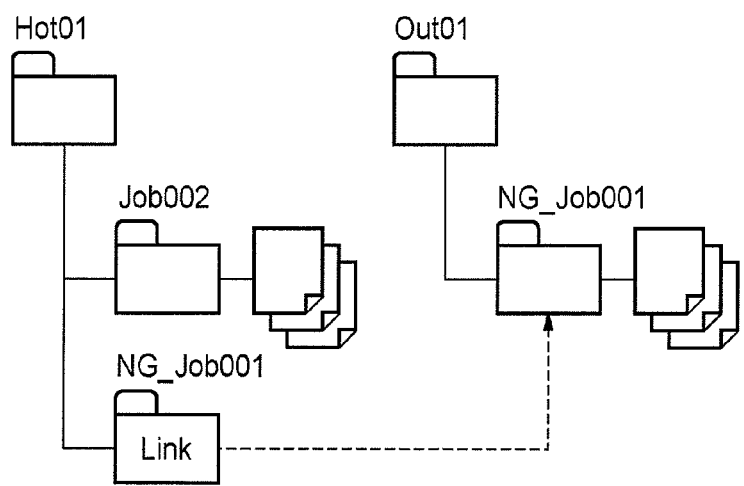
FIG. 7 illustrates a state of a folder when a job ends abnormally.
FIG. 8 illustrates access authorities of each user and an operator with respect to data.

In step S208, processing to be performed when the job execution ends abnormally is performed with respect to the specified job folder. As illustrated in FIG. 7, the job folder Job001 is moved from the system work folder Work to the folder Out01 specified as the output destination of the hot folder Hot01, and the folder name is changed to NG_Job001. The processing of steps S207 and S208 is an example of a third storage.

In step S209, the control unit 11 deletes the file Working_Job001 indicating that job execution is underway from the hot folder Hot01. Under the hot folder Hot01, the control unit 11 generates and stores a folder to which a link to a job folder according to the above execution result is set or a file such as a shortcut in a manner illustrated in FIG. 6 or FIG. 7 (an example of a second storage). The control unit 11 may generate and store a text data file or the like having a file name that enables identifying the job and the job result and including link destination information as file contents.

As described above, according to the present embodiment, the control unit 11 moves a target job folder to the system work folder during the system processing. Therefore, such an effect in terms of system management can be produced that a system failure due to an erroneous deletion or change, by the user, of the job data undergoing processing within the hot folder can be prevented from occurring.

During job processing, a file indicating that job execution is underway is placed in the hot folder Hot01. Further, according to a name of the file/folder placed after the processing ends, the user can determine whether the job ended normally or abnormally. Therefore, such an effect in terms of the user interface can be produced that the user can find out an execution state merely by listing file and folder information under the hot folder Hot01 even without using an application having a special user interface.

Second Embodiment

The present embodiment is described below with reference to FIGS. 1, 2, and 8 to 13, and since FIGS. 1 and 2 are in common with the first embodiment, mainly differences from the first embodiment are described below.

In the present embodiment, security of user data is also taken into consideration. FIG. 8 illustrates a table describing access authorities of each user and an operator with respect to data. The operator can access only system data in the system data area 14 and cannot access user data. Each user can access only their own user data in the user data area 16 and cannot access the other user data. Each user has partial access to the system data area 14 and can also access a folder prepared for each individual user within the hot folder 15.

Figure 9:
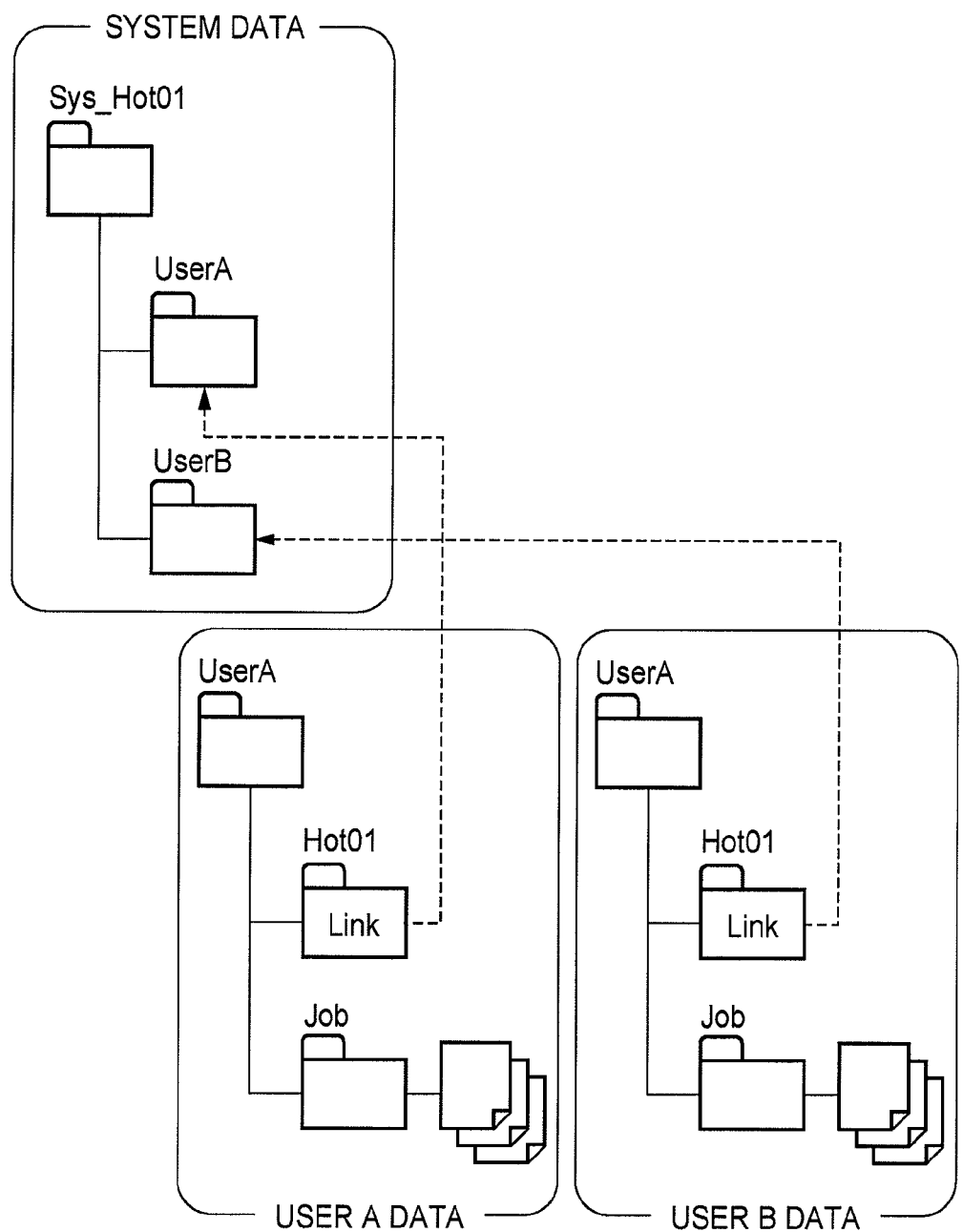
FIG. 9 illustrates a state in which a job execution instruction file has not been input in a second embodiment.

FIG. 9 illustrates a state of a folder before execution of a job. In the following description, the hot folder 15 is considered to be system data. For convenience of description, the example of one hot folder and two users is described here, but the case of a plurality of hot folders and three or more users is also possible. Sub-folders UserA and UserB are prepared for respective users under a hot folder Sys_Hot01. For every user of the user data area 16, a link is set with respect to the hot folder (UserA¥Hot01 and UserB¥Hot01, an example of a fourth folder). Information set with respect to the hot folder Sys_Hot01 is common to all the users, and individual user customized settings can be set for the hot folder of the respective user.

Figure 10:
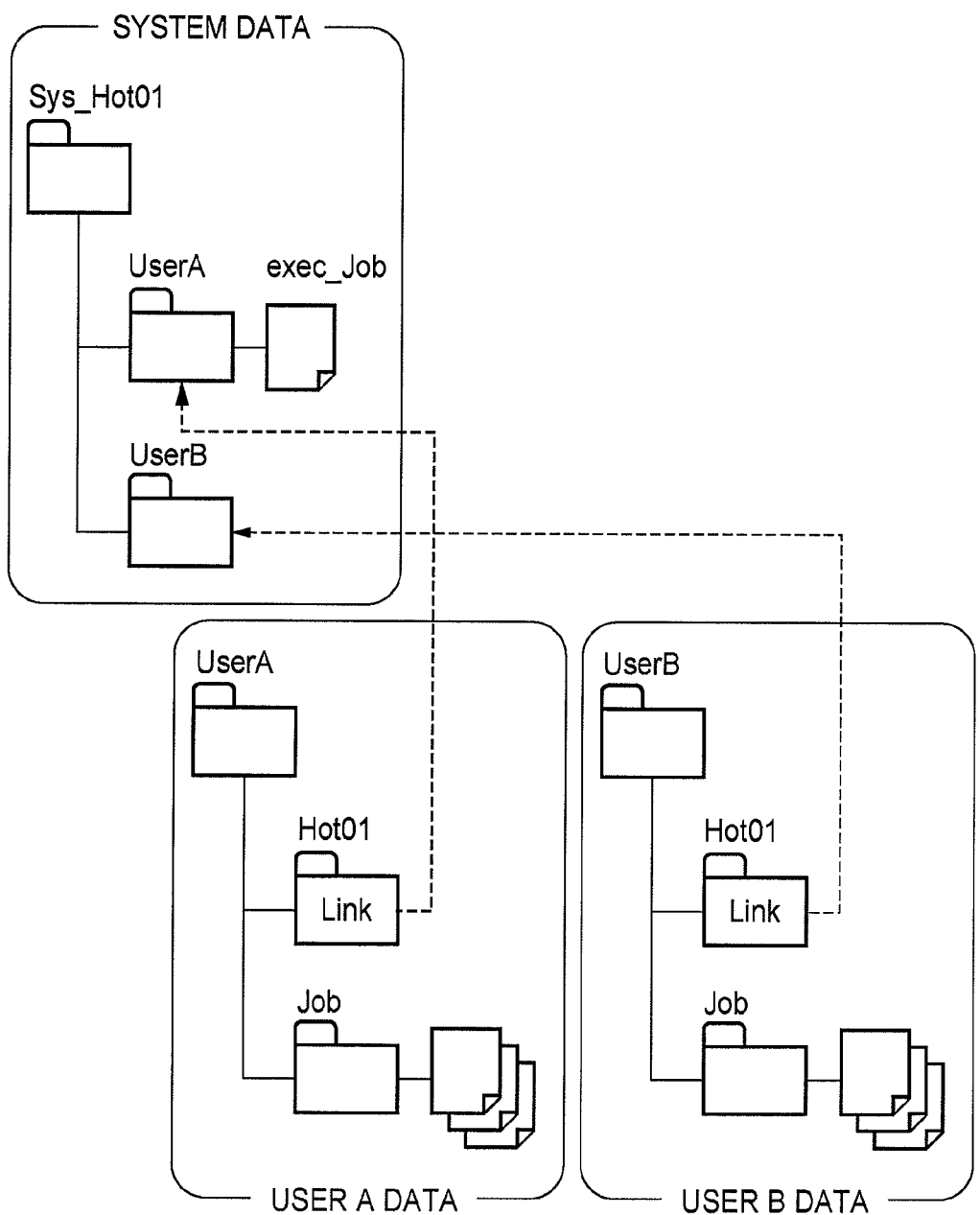
FIG. 10 illustrates a state in which a job execution instruction file has been input.

FIG. 10 illustrates a state of a folder immediately before execution of a job. FIG. 10 illustrates a state in which a job execution instruction file exec_Job has been input into the hot folder of a user A. In this example, the job folder is UserA¥Job within the user data area 16, and information indicating the folder is described in the job execution instruction file exec_Job. When the hot folder monitoring unit 10 detects that the job execution instruction file has been input into the hot folder Sys_Hot01¥UserA, the hot folder monitoring unit 10 notifies the input of the job to the control unit 11.

Figure 11:
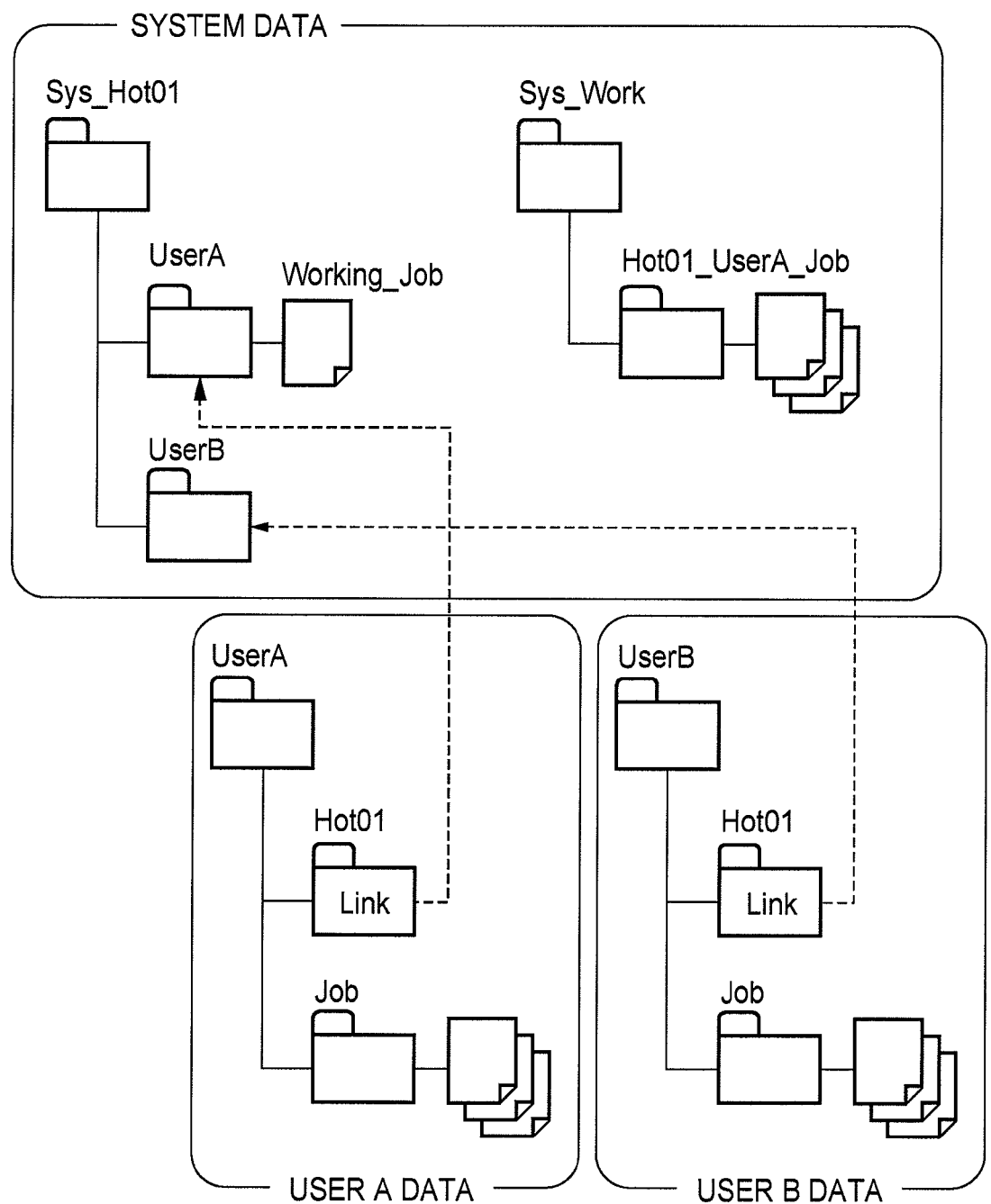
FIG. 11 illustrates a state of a folder while executing a job.

FIG. 11 illustrates a state of a folder while executing a job after the job is input. The control unit 11 copies a job folder from the user data area 16 to the system work folder Sys_Work according to the job input notification from the hot folder monitoring unit 10. At this time, the control unit 11 changes the folder name to Hot01_UserA_Job because information of the names of the hot folder, the user, and the job are inherited. The job execution instruction file exec_Job under the hot folder Sys_Hot01¥UserA is deleted and, instead thereof, a file Working_Job indicating that job execution is underway is placed. The job execution instruction file exec_Job thus deleted may be placed under the job folder Hot01_UserA_Job, as required.

Figure 12:
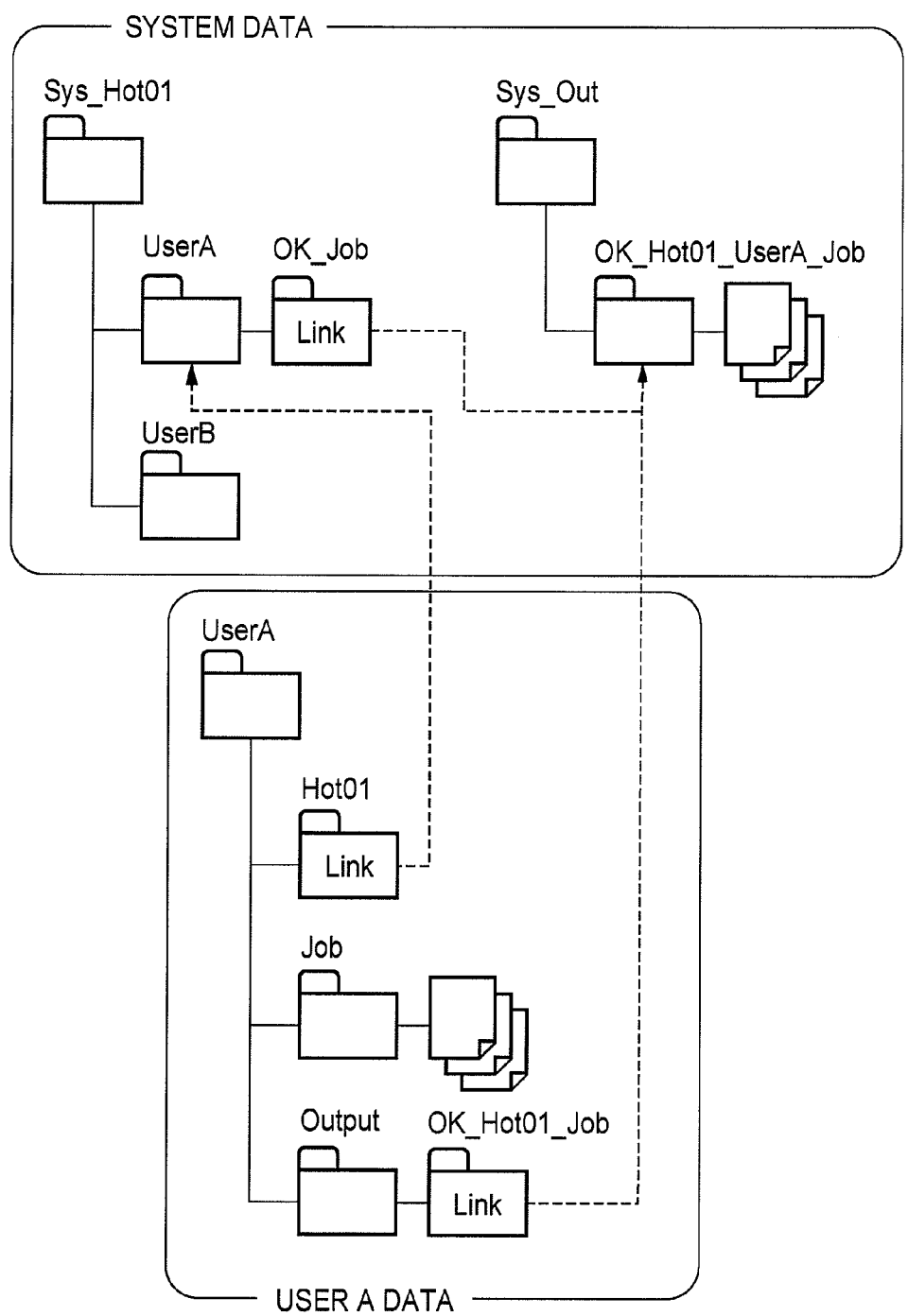
FIG. 12 illustrates a state of a folder when a job ends normally.

FIG. 12 illustrates a state of a folder when the job ends normally. The job folder is moved from the system work folder Sys_Work to a system output folder Sys_Out, and the folder name is changed to OK_Hot01_UserA_Job. A file Working_Job indicating that job execution is underway under the hot folder Sys_Hot01¥UserA is deleted and, instead thereof, a file OK_Job to which a link to the job folder OK_Hot01_UserA_Job is set is placed. In the user data area 16, a link folder OK_Hot01_Job to which a link to the job folder OK_Hot01_UserA_Job is set is placed also under the output folder UserA¥Output set in the hot folder by the user. As described above, each user has partial access to data within the system data area 14 via a link set in the user data area 16.

Figure 13:
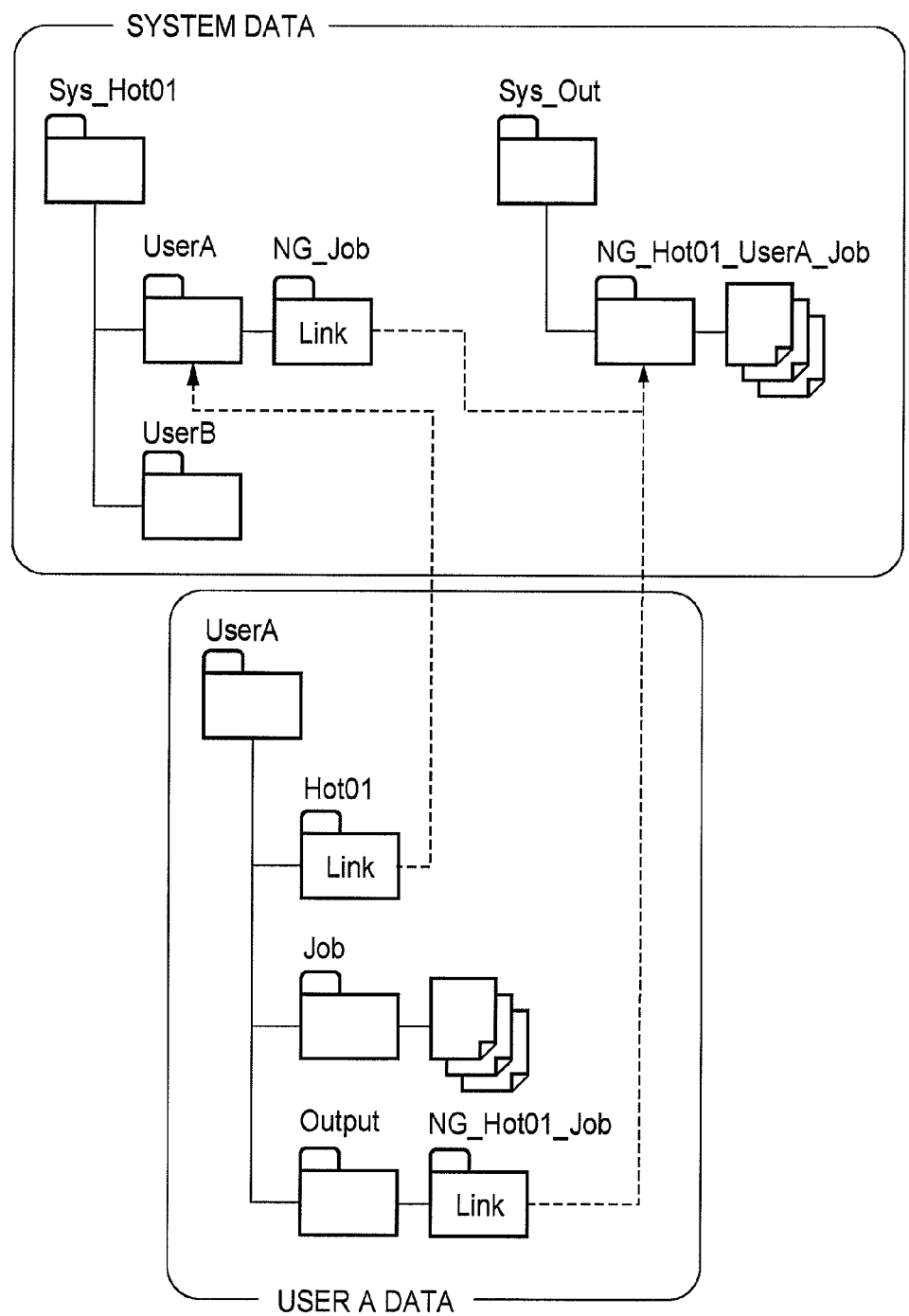
FIG. 13 illustrates a state of a folder when a job ends abnormally.

FIG. 13 illustrates a state of a folder when a job ends abnormally. Unlike in the case when the job ends normally, the name of the job folder indicating the execution result is NG_Hot01_UserA_Job, and the names of the link folders linked to the hot folder and the output folder are NG_Job and NG_Hot01_Job, respectively.

According to the present embodiment, in addition to the first embodiment, output results (OK_Hot01_UserA_Job or the like) can be accessed via a shortcut or the like from folders (for example, UserA or the like) that respective users are allowed to access. As a result, such an effect is produced in terms of security that an illegal access to user data can be prevented.

In the first and second embodiments described above, a plurality of pieces of file data stored in the job folder are described as a job. However, the job data may be a single file and does not need to be stored in the job folder. Also, in this case, the job execution instruction file may be input into the hot folder, and the job execution instruction file itself may have a link to the single file.

In a case where the single file is input as a job, the system may newly create a job folder automatically (Hot01_Job001 or the like in FIG. 5) under the system work folder. In this case, the single file and the job execution instruction file as the job data may be stored under the job folder. In a case where the job data is the single file, the system automatically creates a job folder even if the user does not prepare the job folder, so that such an effect is produced that the number of steps to be executed by the user can be reduced.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-267503, filed Nov. 30, 2010, which is hereby incorporated by reference herein in its entirety.

What is claimed is:

1. An information processing apparatus for processing job data stored in a folder, comprising:
   an input unit configured to input an execution instruction file including a description of an instruction to execute processing into a first folder;
   a movement unit configured to move job data to be subjected to the processing that is stored in the first folder to a second folder different from the first folder when the execution instruction file is input by the input unit;
   a first storage unit configured to store a file including a description indicating that execution of the processing is underway in the first folder after the movement by the movement unit;
   an execution unit configured to execute the processing with respect to the job data to be subjected to the processing that was moved to the second folder by the movement unit;
   a second storage unit configured to store a file including a description of an end of the processing in the first folder in place of the file including a description indicating that execution of the processing is underway when the processing by the execution unit ends; and
   a third storage unit configured to store the job data obtained when execution of the processing by the execution unit ends in a third folder different from the first folder.

2. The information processing apparatus according to claim 1, wherein the second storage unit stores a file including a description of whether the processing result shows a normal end or an abnormal end, as the description of an end of the processing.

3. The information processing apparatus according to claim 1, further comprising:
   a creating unit configured to create a shortcut linked to the job data obtained when the execution of the processing ends in a fourth folder different from the first folder and to which access is allowed on a user-by-user basis.

4. The information processing apparatus according to claim 1, wherein the first folder is a hot folder.

5. An information processing method to be executed in an information processing apparatus for processing job data stored in a folder, the method comprising:
   inputting an execution instruction file including a description of an instruction to execute processing into a first folder;
   moving job data to be subjected to the processing that is stored in the first folder to a second folder different from the first folder when the execution instruction file is input;
   storing a file including a description indicating that execution of the processing is underway in the first folder after the movement;
   executing the processing with respect to the job data to be subjected to the processing that was moved to the second folder;
   storing a file including a description of an end of the processing in the first folder in place of the file including a description indicating that execution of the processing is underway when the execution of the processing ends; and
   storing the job data obtained when the execution of the processing ends in a third folder different from the first folder.

6. A non-transitory computer readable storage medium for storing a program that causes a computer to function so as to:
   input an execution instruction file including a description of an instruction to execute processing on job data into a first folder;
   move job data to be subjected to the processing that is stored in the first folder to a second folder different from the first folder when the execution instruction file is input;
   store a file including a description indicating that execution of the processing is underway in the first folder after the movement;
   execute the processing with respect to the job data to be subjected to the processing that was moved to the second folder;
   store a file including a description of an end of the processing in the first folder in place of the file including a description indicating that execution of the processing is underway when the execution of the processing ends; and
   store the job data obtained when the execution of the processing ends in a third folder different from the first folder.

* * * * *